US011446645B2

(12) United States Patent
Koseoglu et al.

(10) Patent No.: US 11,446,645 B2
(45) Date of Patent: Sep. 20, 2022

(54) FCC CATALYST COMPOSITIONS FOR FLUID CATALYTIC CRACKING AND METHODS OF USING THE FCC CATALYST COMPOSITIONS

(71) Applicants: Saudi Arabian Oil Company, Dhahran (SA); JGC Catalysts and Chemicals Ltd., Kawasaki (JP); Japan Cooperation Center Petroleum, Tokyo (JP)

(72) Inventors: Omer Refa Koseoglu, Dhahran (SA); Yaming Jin, Dhahran (SA); Masaru Ushio, Kanagawa (JP); Seiji Arakawa, Kanagawa (JP)

(73) Assignees: Saudi Arabian Oil Company, Dhahran (SA); JGC Catalysts and Chemicals Ltd., Kawasaki (JP); Japan Cooperation Center Petroleum, Tokyo (JP)

( * ) Notice: Subject to any disclaimer, the term of this patent is extended or adjusted under 35 U.S.C. 154(b) by 102 days.

(21) Appl. No.: 16/919,336

(22) Filed: Jul. 2, 2020

(65) Prior Publication Data
US 2022/0001362 A1    Jan. 6, 2022

(51) Int. Cl.
*B01J 29/08* (2006.01)
*B01J 29/40* (2006.01)
(Continued)

(52) U.S. Cl.
CPC ............ *B01J 29/088* (2013.01); *B01J 29/40* (2013.01); *C10G 11/05* (2013.01); *C10G 11/18* (2013.01);
(Continued)

(58) Field of Classification Search
CPC .... B01J 29/088; B01J 29/40; B01J 2229/183; C10G 11/05; C10G 11/18; C10G 2300/70
(Continued)

(56) References Cited

U.S. PATENT DOCUMENTS

| | | |
|---|---|---|
| 4,210,560 A | 7/1980 | Kehl |
| 4,255,288 A | 3/1981 | Cull et al. |

(Continued)

FOREIGN PATENT DOCUMENTS

| | | |
|---|---|---|
| CN | 101134576 A | 3/2008 |
| CN | 101262945 A | 9/2008 |

(Continued)

OTHER PUBLICATIONS

Search Report and Written Opinion dated Aug. 21, 2015 pertaining to International Application No. PCT/US2015/032129 filed May 22, 2015, 14 pgs.

(Continued)

*Primary Examiner* — Brian A McCaig
(74) *Attorney, Agent, or Firm* — Dinsmore & Shohl LLP

(57) ABSTRACT

A fluid catalytic cracking catalyst composition (FCC catalyst composition) includes a framework-substituted ultra-stable Y-type zeolite (USY zeolite) having one or more transition metals substituted into the framework of a USY zeolite and a FCC zeolite cracking additive. A method for upgrading a hydrocarbon feed includes contacting the hydrocarbon feed with the FCC catalyst composition of the present disclosure at reaction conditions sufficient to upgrade at least a portion of the hydrocarbon feed. A method for upgrading a hydrocarbon feed includes passing the hydrocarbon feed to a fluid catalytic cracking unit, contacting the hydrocarbon feed with a FCC catalyst composition in the fluid catalytic cracking unit under reaction conditions sufficient to cause at least a portion of the hydrocarbon feed to undergo cracking reac- (Continued)

tions to produce a cracking reaction mixture comprising a used FCC catalyst composition and a cracked effluent comprising one or more olefins.

20 Claims, 2 Drawing Sheets

(51) Int. Cl.
  *C10G 11/05* (2006.01)
  *C10G 11/18* (2006.01)
(52) U.S. Cl.
  CPC ..... *B01J 2229/183* (2013.01); *C10G 2300/70* (2013.01)
(58) Field of Classification Search
  USPC .......................................................... 208/119
  See application file for complete search history.

(56) References Cited

U.S. PATENT DOCUMENTS

| | | | |
|---|---|---|---|
| 4,826,586 A | 5/1989 | Herbst et al. | |
| 4,855,036 A | 8/1989 | Chiang et al. | |
| 5,308,813 A | 5/1994 | Vaughan et al. | |
| 5,411,724 A | 5/1995 | Beyer et al. | |
| 6,069,012 A | 5/2000 | Kayser | |
| 6,132,594 A | 10/2000 | Okazaki et al. | |
| 6,267,873 B1 * | 7/2001 | Das | C10G 11/18 208/113 |
| 6,346,224 B1 | 2/2002 | Vitale-Rojas et al. | |
| 6,358,486 B1 | 3/2002 | Shan et al. | |
| 6,482,313 B1 | 11/2002 | Schuette et al. | |
| 6,726,834 B2 | 4/2004 | Quesada et al. | |
| 6,762,143 B2 | 7/2004 | Shan et al. | |
| 7,084,087 B2 | 8/2006 | Shan et al. | |
| 7,550,405 B2 | 6/2009 | Shan et al. | |
| 8,002,970 B2 | 8/2011 | Euzen et al. | |
| 9,221,036 B2 | 12/2015 | Koseoglu et al. | |
| 10,081,009 B2 | 9/2018 | Koseoglu et al. | |
| 10,357,761 B2 | 7/2019 | Koseoglu et al. | |
| 2003/0006168 A1 | 1/2003 | Ino et al. | |
| 2009/0283443 A1 | 11/2009 | Kuroda et al. | |
| 2011/0251049 A1 | 10/2011 | Kuroda et al. | |
| 2013/0175202 A1 | 7/2013 | Koseoglu et al. | |
| 2015/0111721 A1 | 4/2015 | Tian et al. | |
| 2015/0111722 A1 | 4/2015 | Long et al. | |
| 2015/0375218 A1 * | 12/2015 | Koseoglu | C10L 1/06 208/120.1 |

FOREIGN PATENT DOCUMENTS

| | | |
|---|---|---|
| CN | 101898144 A | 12/2010 |
| JP | H07308581 A | 11/1995 |
| WO | 2011115785 A1 | 9/2011 |
| WO | 2013057319 A2 | 4/2013 |
| WO | 2013123299 A1 | 8/2013 |
| WO | 2015179735 A1 | 11/2015 |
| WO | 2019147465 A1 | 8/2019 |
| WO | 2021086632 A1 | 5/2021 |

OTHER PUBLICATIONS

Wang et al. "Characterization of titanium-modified USY zeolites and their catalytic performance on n-heptane cracking" Applied Catalysis A: General 214 (2001) 167-177, 11 pgs.

ASTM International "Standard Test Method for Testing Fluid Catalytic Cracking (FCC) Catalysts by Microactivity Test", Designation: D3907/D3907M-19, Apr. 1, 2019.

ASTM International "Standard Test Method for Determining Activity and Selectivity of Fluid Catalytic Cracking (FCC) Catalysts by Microactivity Test", Designation: D5154/D5154M-18, May 1, 2018.

Bradley et al., "Characterization and Catalyst Development", ACS Symposium Series: American Chemical Society, Washington, DC 1989.

International Search Report and Written Opinion dated Jun. 22, 2021 pertaining to PCT/US2021/024620 filed Mar. 29, 2021, 12 pages.

* cited by examiner

FCC CATALYST COMPOSITIONS FOR FLUID CATALYTIC CRACKING AND METHODS OF USING THE FCC CATALYST COMPOSITIONS

BACKGROUND

Field

The present disclosure generally relates to processes for upgrading hydrocarbons, more specifically, to catalyst compositions and fluidized catalytic cracking processes for upgrading hydrocarbons using the catalyst compositions.

Technical Background

Petrochemical feeds, such as crude oils, can be converted to chemical products and intermediates such as olefins and aromatic compounds, which are basic intermediates for a large portion of the petrochemical industry. The worldwide increasing demand for light olefins and aromatic compounds remains a major challenge for many integrated refineries. In particular, the production of some valuable light olefins, such as ethylene, propene, and butenes, has attracted increased attention as pure olefin streams are considered the building blocks for polymer synthesis. Additionally, aromatic compounds such as benzene, toluene, ethylbenzene, and xylenes can be valuable intermediates for synthesizing polymers and other organic compounds as well as for fuel additives.

SUMMARY

The fluidized catalytic cracking (FCC) unit is one of the primary hydrocarbon conversion units in the modern petroleum refinery. The FCC unit may predominantly produce gasoline in a conventional FCC unit, or produce propylene in a high severity FCC unit. Conventional FCC units may operate at temperatures of from 500 degrees Celsius (° C.) to 550° C., and a catalyst to oil ratio from 3.0:1 to 6.0:1. High severity FCC units, on the other hand, may operate at temperatures of from 600° C. to 650° C. and a catalyst to oil ratio greater than 6.0:1. In high severity FCC units, the hydrocarbons may be converted to gasoline over an FCC catalyst, which can then be converted to olefins over an FCC catalyst additive. The olefins may include ethylene, propylene, butenes, or combinations of these.

In FCC processes, hydrocarbons are catalytically cracked with an acidic catalyst maintained in a fluidized state. The catalyst may be regenerated on a continuous basis. One of the main products from such processes has typically been gasoline. Other products may also be produced in smaller quantities, such as liquid petroleum gas and cracked gas oil. The gasoline and other hydrocarbon products may be further upgraded to light olefins, such as ethylene, propylene, butenes, or combinations of these, during the FCC process. Coke deposited on the catalyst is burned off at high temperatures and in the presence of air prior to recycling regenerated catalyst back to the reaction zone. Despite the many advances in FCC processes, the industry is constantly seeking improved catalyst materials, particularly those capable of increasing conversion to the desired products.

Accordingly, there is an ongoing need for fluidized catalytic cracking catalyst compositions and methods of upgrading hydrocarbons to increase the efficiency of the cracking process and improve yields of greater value products, such as light olefins. The present disclosure is directed to fluid catalytic cracking (FCC) catalyst compositions that comprise a framework-substituted ultra-stable Y zeolite and a FCC zeolite cracking additive. These FCC catalyst compositions may feature greater cracking activity with reduced production of dry gas and coke compared to conventional cracking catalysts commonly used in FCC units. The FCC catalyst compositions of the present disclosure may greatly increase conversion of a hydrocarbon feed to desirable products, such as light olefins and gasoline.

According to one or more aspects of the present disclosure, an FCC catalyst composition may include a framework-substituted USY zeolite comprising one or more transition metals substituted into the framework of an USY zeolite. The FCC catalyst composition may further include from 1 weight percent to 50 weight percent FCC zeolite cracking additive based on the total weight of the FCC catalyst composition.

In one or more other aspects of the present disclosure, a method for upgrading a hydrocarbon feed may include contacting the hydrocarbon feed with a FCC catalyst composition at reaction conditions sufficient to upgrade at least a portion of the hydrocarbon feed. The FCC catalyst composition may include a framework-substituted USY zeolite and from 1 weight percent to 50 weight percent FCC zeolite cracking additive based on the total weight of the FCC catalyst composition. The framework-substituted USY zeolite may include hafnium, zirconium, titanium, or combinations of these substituted into the framework of the framework-substituted USY zeolite.

In still other aspects of the present disclosure, a method for upgrading a hydrocarbon feed may include passing a hydrocarbon feed to a fluid catalytic cracking unit. The method may further comprise contacting the hydrocarbon feed with a FCC catalyst composition in the fluid catalytic cracking unit under reaction conditions sufficient to cause at least a portion of the hydrocarbon feed to undergo cracking reactions. The cracking reactions may produce a cracking reaction mixture comprising a used FCC catalyst composition and a cracked effluent comprising one or more olefins. The FCC catalyst composition may include a framework-substituted USY zeolite comprising, hafnium, zirconium, titanium, or combinations of these substituted into the framework of the framework-substituted USY zeolite. The FCC catalyst composition may further include from 1 weight percent to 50 weight percent FCC zeolite cracking additive based on the total weight of the FCC catalyst composition. The method may further include passing the cracking reaction mixture to a catalyst separator that separates the cracking reaction mixture into the used FCC catalyst composition and the cracked effluent and passing the cracked effluent out of the fluid catalytic cracking unit.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
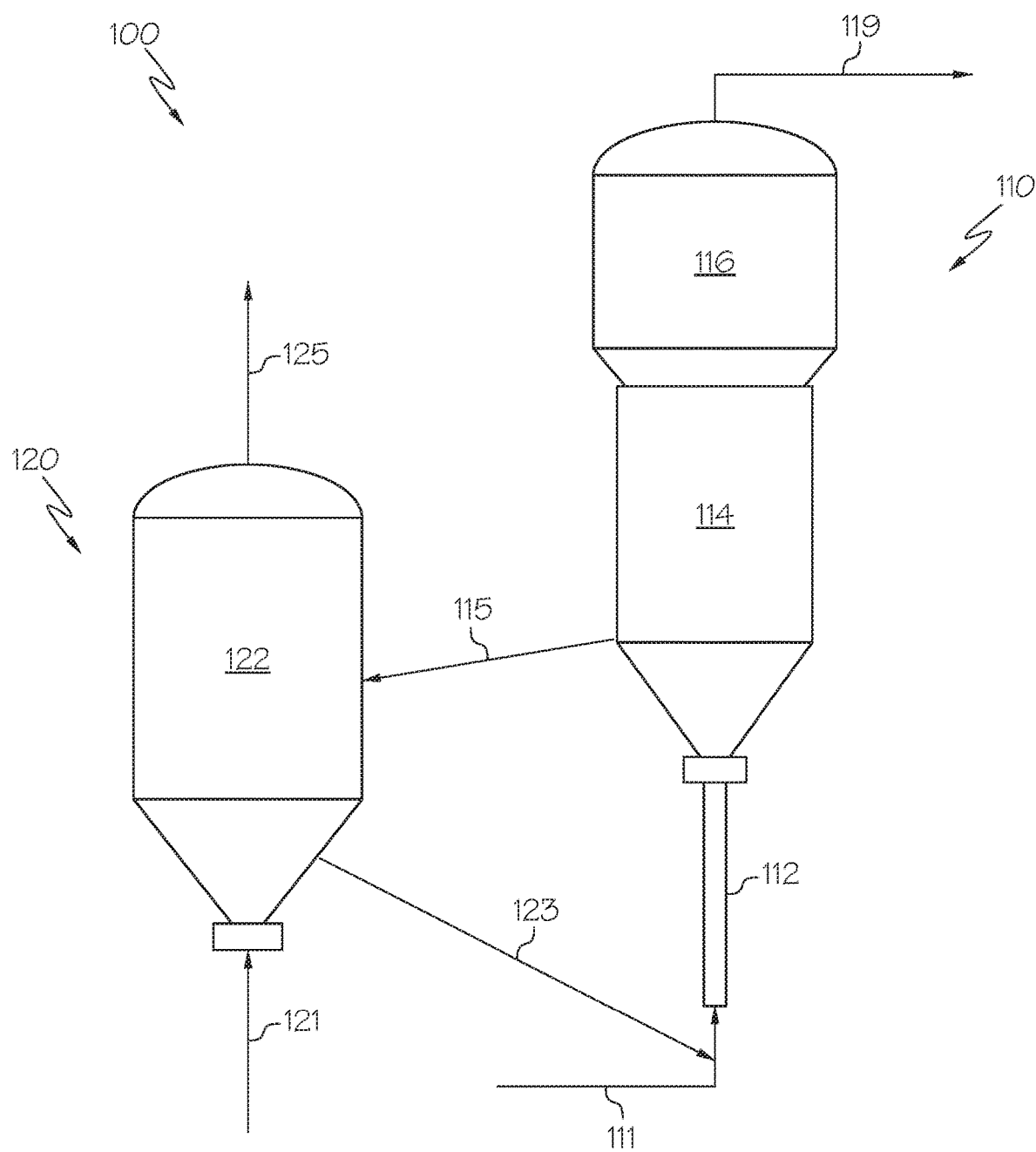
FIG. 1 schematically depicts a generalized flow diagram of a system for upgrading a hydrocarbon feed, according to one or more embodiments shown and described in this disclosure.
Figure 2:
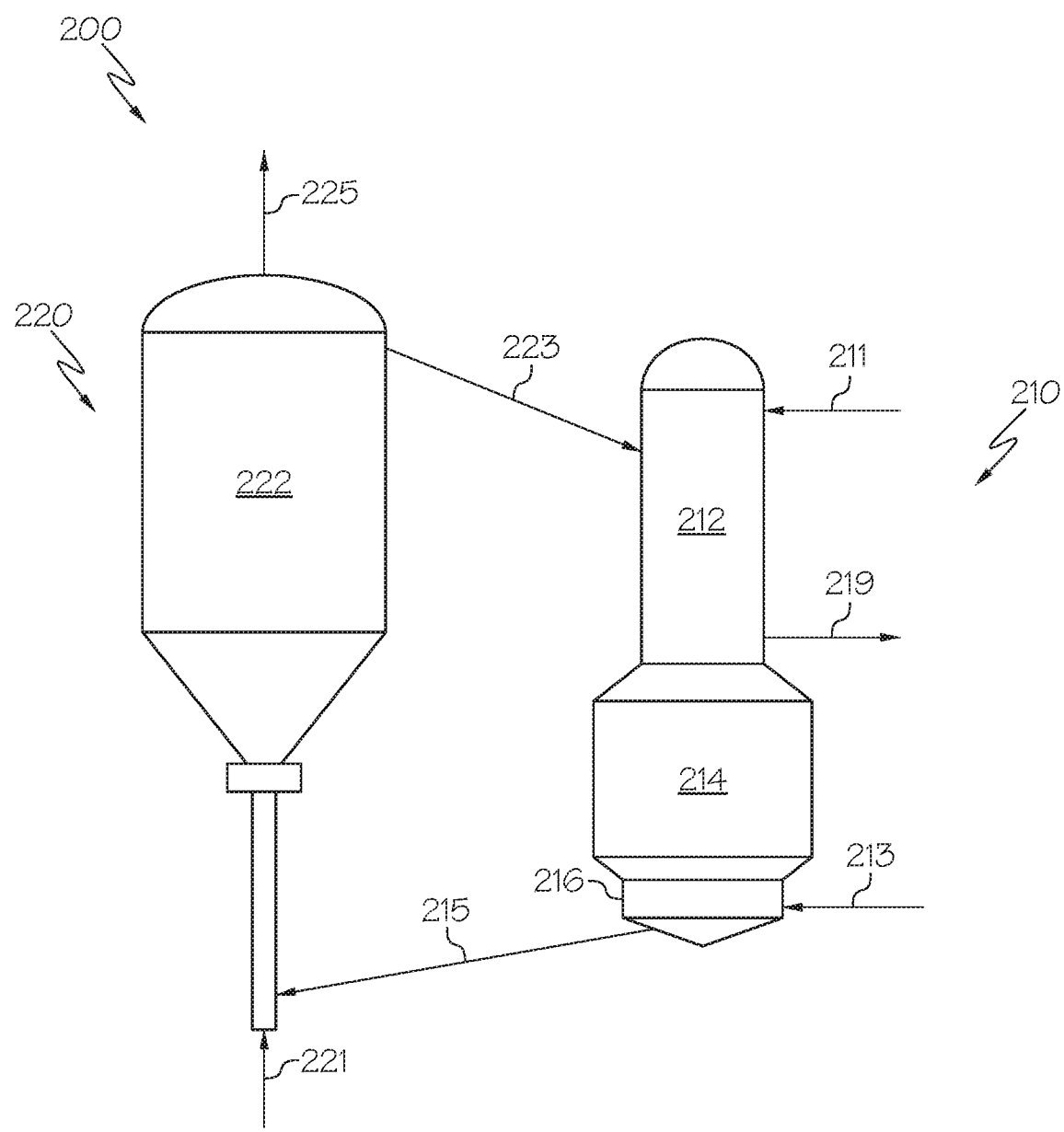
FIG. 2 schematically depicts a generalized flow diagram of another system for upgrading a hydrocarbon feed, according to one or more embodiments shown and described in this disclosure.

For the purpose of describing the simplified schematic illustrations and descriptions of FIGS. 1-2, the numerous valves, temperature sensors, electronic controllers, and the like that may be employed and well known to those of ordinary skill in the art of certain chemical processing operations are not included. Further, accompanying components that are often included in chemical processing operations, such as, for example, air supplies, heat exchangers, surge tanks, catalyst hoppers, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1-2. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

The present disclosure is directed to fluid catalytic cracking catalyst compositions and methods of upgrading hydrocarbons through the cracking of a hydrocarbon feed using the fluid catalytic cracking catalyst composition. In particular, the present disclosure is directed to a fluid catalytic cracking catalyst composition (FCC catalyst composition) comprising a framework-substituted ultra-stable Y zeolite (framework-substituted USY zeolite) and an FCC zeolite cracking additive. The present disclosure is also directed to methods of upgrading a hydrocarbon feed using the FCC catalyst composition. The methods may comprise contacting the hydrocarbon feed with the FCC catalyst composition in a fluid catalytic cracking unit at reaction conditions sufficient to upgrade at least a portion of the hydrocarbon feed to produce one or more olefins.

The various FCC catalyst compositions and methods of the present disclosure for upgrading hydrocarbons may provide increased efficiency for the fluidized catalytic cracking process compared to conventional catalysts used in FCC processes. That is, the various FCC catalyst compositions and methods for upgrading hydrocarbons of the present disclosure may increase conversion of a hydrocarbon feed and increase the yield of desirable products, such as light olefins (ethylene, propylene, butene, or combinations of these) and gasoline. The FCC catalyst compositions and methods for upgrading hydrocarbons of the present disclosure may also provide decreased production of dry gas and coke.

As used in this disclosure, a "catalyst" may refer to any substance that increases the rate of a specific chemical reaction. Catalysts and catalyst components described in this disclosure may be utilized to promote various reactions, such as, but not limited to cracking, aromatic cracking, or combinations of these.

As used in this disclosure, "cracking" may refer to a chemical reaction where a molecule having carbon-carbon bonds is broken into more than one molecule by the breaking of one or more of the carbon-carbon bonds; where a compound including a cyclic moiety, such as an aromatic, is converted to a compound that does not include a cyclic moiety; or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality.

As used throughout the present disclosure, the term "light olefins" may refer to one or more of ethylene, propylene, butenes, or combinations of these.

As used throughout the present disclosure, the term "butene" or "butenes" may refer to one or more than one isomer of butene, such as one or more of 1-butene, trans-2-butene, cis-2-butene, isobutene, or mixtures of these isomers. As used throughout the present disclosure, the term "normal butenes" may refer to one or more than one of 1-butene, trans-2-butene, cis-2-butene, or mixtures of these isomers, and does not include isobutene. As used throughout the present disclosure, the term "2-butene" may refer to trans-2-butene, cis-2-butene, or a mixture of these two isomers.

As used throughout the present disclosure, the term "crude oil" or "whole crude oil" may refer to crude oil received directly from an oil field or from a desalting unit without having any fraction separated by distillation.

As used throughout the present disclosure, the terms "upstream" and "downstream" may refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in the present disclosure, passing a stream or effluent from one unit "directly" to another unit may refer to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined.

As used in this disclosure, the term "effluent" may refer to a stream that is passed out of a reactor, a reaction zone, or a separation unit following a particular reaction or separation. Generally, an effluent has a different composition than the stream that entered the separation unit, reactor, or reaction zone. It should be understood that when an effluent is passed to another system unit, only a portion of that system stream may be passed. For example, a slip stream may carry some of the effluent away, meaning that only a portion of the effluent may enter the downstream system unit. The term "reaction effluent" may more particularly be used to refer to a stream that is passed out of a reactor or reaction zone.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "hydrogen stream" passing to a first system component or from a first system component to a second system component should be understood to equivalently disclose "hydrogen" passing to the first system component or passing from a first system component to a second system component.

As previously discussed, the FCC catalyst compositions of the present disclosure include a framework-substituted USY zeolite having one or more transition metals substituted into the framework of the USY zeolite. The FCC catalyst compositions may also include from 1 wt. % to 50 wt. % FCC zeolite cracking additive based on the total weight of the FCC catalyst composition. The FCC catalyst compositions of the present disclosure may be used alone or in combination with other fluidized catalytic cracking catalyst materials in an FCC process for converting hydrocarbons to gasoline, olefins, or other valuable products and intermediates.

The framework-substituted USY zeolite may be a USY zeolite that contains one or more transition metal atoms constituting at least a portion of the framework of the USY zeolite. The framework-substituted USY zeolite is a USY zeolite in which silicon atoms and aluminum atoms form a zeolite framework and in which a portion of the aluminum atoms forming a zeolite framework are substituted with the transition metal atoms, such as atoms of hafnium, zirconium, titanium, or combinations of these. The framework-substituted USY zeolite may include from 0.1 wt. % to 5 wt. % of each transition metal based on the total weight of the framework-substituted USY zeolite. For example, the framework-substituted USY zeolite may comprise from 0.1 wt. % to 4 wt. %, 0.2 wt. % to 4 wt. %, or from 0.3 wt. % to 3 wt. %, of each transition metal based on the total weight of the framework-substituted USY zeolite. The framework-substituted USY zeolite may include from 0.1 wt. % to 15 wt. % transition metal based on the total weight of the framework-substituted USY zeolite. For example, the framework-substituted USY zeolite may comprise from 0.1 wt. % to 12.5 wt. %, 0.5 wt. % to 10 wt. %, or from 1.0 wt. % to 7.5 wt. %, transition metal based on the total weight of the framework-substituted USY zeolite. The amount of transition metals substituted into the framework-substituted USY zeolite may include both the transition metal atoms substituted for aluminum atoms within the zeolite framework and the transition metal atoms that are not substituted for aluminum atoms but are carried on inner surfaces of pores of the framework-substituted USY zeolite.

The one or more transition metals may comprise hafnium, zirconium, titanium, or combinations of these. In embodiments, the one or more transition metals comprise hafnium. In embodiments, the framework-substituted USY zeolite may include zirconium, titanium, or zirconium and titanium. In embodiments, the framework-substituted USY zeolite may include hafnium, zirconium, or hafnium and zirconium. At least a portion of the hafnium, zirconium, titanium, or combinations of these transition metals may be carried on or combined with inner surfaces of pores of the USY zeolite, for instance, in the form of metal oxides, such as hafnium oxide particles, zirconium oxide particles, titanium oxide particles, or combinations of these. The metal oxides of hafnium, zirconium, titanium, or combinations of these may be combined with inner surfaces of the mesopores of the USY zeolite.

In embodiments, suitable compounds of hafnium may include, for example, hafnium nitrate, hafnium chloride, hafnium fluoride, hafnium bromide, and hafnium oxalate. Suitable compounds of zirconium may include, for example, zirconium sulfate, zirconium nitrate, and zirconium chloride. Suitable compounds of titanium may include titanium sulfate, titanium acetate, titanium chloride, titanium nitrate, and titanium lactate.

The framework substitution of the transition metal atoms into the framework of the framework-substituted USY zeolite may be verified by, for example, X-ray fluorescence, high frequency plasma emission spectrometry, atomic absorption spectrometry, ultraviolet-visible-near-infrared spectrophotometry (UV-Vis-NIR), Fourier transform infrared spectroscopy (FT-IR), or nuclear magnetic resonance spectrometry (NMR).

The framework-substituted USY zeolite may have a crystal lattice constant from 2.430 nanometers to 2.450 nanometers, such as, from 2.432 nm to 2.434 nm, from 2.432 nm to 2.436 nm, from 2.432 nm to 2.438 nm, from 2.432 nm to 2.440 nm, from 2.432 nm to 2.442 nm, from 2.432 nm to 2.444 nm, from 2.432 nm to 2.446 nm, from 2.432 nm to 2.448 nm, from 2.434 nm to 2.436 nm, from 2.434 nm to 2.438 nm, from 2.434 nm to 2.440 nm, from 2.434 nm to 2.442 nm, from 2.434 nm to 2.444 nm, from 2.434 nm to 2.446 nm, from 2.434 nm to 2.448 nm, from 2.434 nm to 2.450 nm, from 2.436 nm to 2.438 nm, from 2.436 nm to 2.440 nm, from 2.436 nm to 2.442 nm, from 2.436 nm to 2.444 nm, from 2.436 nm to 2.446 nm, from 2.436 nm to 2.448 nm, from 2.436 nm to 2.450 nm, from 2.438 nm to 2.440 nm, from 2.438 nm to 2.442 nm, from 2.438 nm to 2.444 nm, from 2.438 nm to 2.446 nm, from 2.438 nm to 2.448 nm, from 2.438 nm to 2.450 nm, from 2.440 nm to 2.442 nm, from 2.440 nm to 2.444 nm, from 2.440 nm to 2.446 nm, from 2.440 nm to 2.448 nm, from 2.440 nm to 2.450 nm, from 2.442 nm to 2.444 nm, from 2.442 nm to 2.446 nm, from 2.442 nm to 2.448 nm, from 2.442 nm to 2.450 nm, from 2.444 nm to 2.446 nm, from 2.444 nm to 2.448 nm, from 2.444 nm to 2.450 nm, from 2.446 nm to 2.448 nm, from 2.446 nm to 2.450 nm, or from 2.448 nm to 2.450 nm. The crystal lattice constant may be measured using ASTM method D3942. A crystal lattice constant less than 2.430 nm may tend to reduce the activity of the FCC catalyst composition. Not intending to be bound to any particular theory, the activity of the FCC catalyst composition may be reduced because of a high $SiO_2/Al_2O_3$ molar ratio in the framework structure and a small number of solid acid sites serving as active sites for cracking. Similarly, a crystal lattice constant greater than 2.450 nm may result in the breaking of the crystal structure of the framework-substituted USY zeolite during FCC reactions. Not intending to be bound to any particular theory, it is believed that the breaking of the crystal structure of the framework-substituted USY zeolite during FCC reactions may be caused by low heat resistance, which may also result in a reduction in the activity of the FCC catalyst composition.

The framework-substituted USY zeolite may have a specific surface area from 600 square meters per gram to 900 square meters per gram, as determined by the Brunauer-Emmett-Teller (BET) method. For example, the framework-substituted USY zeolite may comprise a specific surface area from 600 $m^2/g$ to 875 $m^2/g$, from 600 $m^2/g$ to 850 $m^2/g$, from 600 $m^2/g$ to 825 $m^2/g$, from 600 $m^2/g$ to 800 $m^2/g$, from 600 $m^2/g$ to 775 $m^2/g$, from 600 $m^2/g$ to 750 $m^2/g$, from 600 $m^2/g$ to 725 $m^2/g$, from 600 $m^2/g$ to 700 $m^2/g$, from 600 $m^2/g$ to 675 $m^2/g$, from 600 $m^2/g$ to 650 $m^2/g$, from 600 $m^2/g$ to 625 $m^2/g$, from 625 $m^2/g$ to 900 $m^2/g$, from 650 $m^2/g$ to 900 $m^2/g$, from 675 $m^2/g$ to 900 $m^2/g$, from 700 $m^2/g$ to 900 $m^2/g$, from 725 $m^2/g$ to 900 $m^2/g$, from 750 $m^2/g$ to 900 $m^2/g$, from 775 $m^2/g$ to 900 $m^2/g$, from 800 $m^2/g$ to 900 $m^2/g$, from 825 $m^2/g$ to 900 $m^2/g$, from 850 $m^2/g$ to 900 $m^2/g$, or from 875 $m^2/g$ to 900 $m^2/g$. A specific surface area less than 600 $m^2/g$ may reduce the number of solid acid sites having effective catalytic activity during FCC reactions. Similarly, a specific surface area exceeding 900 $m^2/g$ may be impractical due to production limitations. However, advantages may be found if developments in processing the zeolite material are discovered.

The framework-substituted USY zeolite may have a molar ratio of silica ($SiO_2$) to alumina ($Al_2O_3$) from 5:1 to 100:1. For example, the framework-substituted USY zeolite may comprise a molar ratio of $SiO_2$ to $Al_2O_3$ from 10:1 to 100:1, from 20:1 to 100:1, from 30:1 to 100:1, from 40:1 to 100:1, from 50:1 to 100:1, from 60:1 to 100:1, from 70:1 to 100:1, from 80:1 to 100:1, from 90:1 to 100:1, from 5:1 to 90:1, from 5:1 to 80:1, from 5:1 to 70:1, from 5:1 to 60:1, from 5:1 to 50:1, from 5:1 to 40:1, from 5:1 to 30:1, from 5:1 to 20:1, from 5:1 to 10:1, from 10:1 to 95:1, from 15:1 to 90:1, from 20:1 to 85:1, or from 25:1 to 80:1. A molar ratio of $SiO_2$ to $Al_2O_3$ less than 5:1 may not result in an effective pore volume. Not intending to be bound to any particular theory, it is believed that an ineffective pore volume may cause a reduction in activity in cracking. Similarly, a molar ratio of $SiO_2$ to $Al_2O_3$ greater than 100:1 may result in a reduced number of solid acid sites. Not intending to be bound to any particular theory, it is believed that a reduced number of solid acid sites may cause a reduction in activity in cracking.

To produce the framework-substituted USY zeolite, a portion of the aluminum atoms within the USY zeolite may be substituted with hafnium atoms, zirconium atoms, titanium atoms, or combinations of these. The framework-substituted USY zeolite may be produced by firing USY zeolite at a temperature of from 500° C. to 700° C. A suspension may then be formed containing the fired USY zeolite, the suspension having a liquid to solid mass ratio from 5 to 15. An inorganic acid or an organic acid may be added so that a pH of the solution may be from 1.0 to 2.0. A solution containing a transition metal, such as hafnium, zirconium, or titanium, may then be mixed with the suspension. The mixture comprising the suspension and the transition metal solution may be neutralized with, for example, an aqueous ammonia, so that the pH is about 7.0.

A USY zeolite may be used as a raw material for a method of preparing the framework-substituted USY zeolite. The USY zeolite may be a commercially available USY zeolite or may be prepared from a Y zeolite. Production methods for USY zeolite are known to a person having ordinary skill in the art. For instance, one production method for the above USY zeolite may include subjecting a Y-type zeolite (Na—Y) synthesized by a common method to the exchange of sodium ions with ammonium ions by a conventional method, such as, dispersing Y-type zeolite in water to prepare a suspension, adding ammonium sulfate to the suspension, washing the solid matter with water, washing the solid matter with ammonium sulfate aqueous solution at a temperature from 40° C. to 80° C., washing the solid matter with water at a temperature from 40° C. to 95° C., and drying the solid matter at a temperature from 100° C. to 180° C. for about 30 minutes. Accordingly, an ammonium-exchanged Y-type zeolite, $NH_4$—$^{50\ to\ 70}Y$, in which about 50 wt. % to 70 wt. % of Na contained in the Y-type zeolite is substituted with $NH_4$.

Subsequently, a hydrogen type Y-zeolite (HY) may be prepared by calcining the above ammonium-exchanged Y-type zeolite ($NH_4$—$^{50\ to\ 70}Y$) at from 500° C. to 800° C. for 10 minutes to 10 hours in, for example, a saturated vapor atmosphere. Then, an ammonium-exchanged Y-type zeolite ($NH_4$—$^{80\ to\ 97}Y$), in which about 80 wt. % to 97 wt. % of Na contained in the initial Y-type zeolite (Na—Y) is ion-exchanged with $NH_4$, is obtained. The hydrogen Y-type zeolite obtained above may be dispersed in water at a temperature of 40° C. to 95° C. to prepare a suspension and ammonium sulfate is added to the suspension. The suspension may then be stifled at a temperature of 40° C. to 95° C. for 10 minutes to 3 hours. Then, the solid matter may be washed with water at a temperature of 40° C. to 95° C., then with an ammonium sulfate aqueous solution at a temperature of at a temperature of 40° C. to 95° C., and subsequently with water at a temperature of 40° C. to 80° C. Then, the solid matter is dried at a temperature from 100° C. to 180° C. for about 30 minutes to 30 hours. In embodiments, the final ammonium ion exchange rate may be 90% or greater.

The ammonium-exchanged Y-type zeolite ($NH_4$—$_{80\ to\ 97}$Y) thus obtained may be calcined at 500° C. to 700° C. for 10 minutes to 10 hours in, for example, a saturated vapor atmosphere. Accordingly, a USY zeolite may be prepared having a crystal lattice constant of from 2.430 nanometers to 2.450 nanometers, a specific surface area of from 600 square meters per gram to 900 square meters per gram, and a molar ratio of $SiO_2$ to $Al_2O_3$ of from 5:1 to 100:1.

In the method for producing the framework-substitute USY zeolite of the present disclosure, non-framework aluminum may be removed from the USY zeolite described above in order to obtain the USY zeolite having a crystal lattice constant of 2.430 nanometers to 2.450 nanometers. Non-framework aluminum may be removed by, for example, a method of dispersing the USY zeolite describe above in water at temperatures of from 40° C. to 95° C. to prepare a suspension, adding sulfuric acid to the suspension, and stifling the suspension for 10 minutes to 3 hours while maintaining the temperature at 40° C. to 95° C. to dissolve the non-framework aluminum. After dissolving the non-framework aluminum, the suspension may be filtered, and a residue on the filter may be washed with purified water at a temperature from 40° C. to 95° C. and dried at a temperature from 100° C. to 145° C., whereby an USY zeolite from which the non-framework aluminum is removed may be obtained.

In the method for producing the framework-substituted USY zeolite of the present disclosure, the USY zeolite may be calcined at a temperature from 500° C. to 700° C., such as from 550° C. to 650° C. The time duration of calcining is typically not critical so long as the targeted framework-substituted USY zeolite is obtained. In embodiments, the time duration of calcining may be from 30 minutes to 10 hours. In embodiments, the calcining atmosphere for calcining the USY zeolite is air.

The calcined USY zeolite may then be framework-substituted with one or more of hafnium, titanium, zirconium, or combinations of these. To framework substitute the calcined USY zeolite, the calcined USY zeolite may be suspended in water having a temperature from 20° C. to 30° C. to form a suspension. The liquid to solid mass ratio may be in the range of 5:1 to 15:1, such as 8:1 to 12:1. Next, an inorganic acid or an organic acid may be added to the suspension so that a pH of the suspension may be controlled to a range of 1.0 to 2.0. The pH of the suspension may be controlled in the range from 1.0 to 2.0 to prevent a precipitate from being generated during mixing of the aqueous solution of the hafnium compound, the zirconium compound, the titanium compound, or combinations of these, with a suspension of the USY zeolite. Inorganic acids may include, but are not limited to, sulfuric acid, nitric acid, or hydrochloric acid. Organic acids may include, but are not limited to, carboxylic acid. Subsequently, a solution comprising a hafnium compound, a zirconium compound, a titanium compound, or combinations of these, may be added to the suspension and admixed.

Mixing of the aqueous solution of the hafnium compound, the zirconium compound, the titanium compound, or combinations of these, with a suspension of the USY zeolite may be conducted by gradually adding the aqueous solution of the hafnium compound, the zirconium compound, the tita- nium compound, or combinations of these, to the suspension of the USY zeolite. After completion of the addition of the aqueous solution to the suspension, the solution may be mixed by stirring at, for example, ambient conditions (about 25° C.) for 3 hours to 5 hours. After completion of the mixing, the admixed solution may be neutralized by adding an alkali compound such as, but not limited to, aqueous ammonia so that a pH may be controlled to 7.0 to 7.5. The resulting framework-substituted USY zeolite may be filtered, washed with water, and dried at a temperature of from 80° C. to 180° C.

The FCC catalyst composition may comprise from 5 wt. % to 60 wt. % framework-substituted USY zeolite based on the total weight of the FCC catalyst composition. In embodiments, the FCC catalyst composition of the present disclosure may include from 5 wt. % to 10 wt. %, from 5 wt. % to 15 wt. %, from 5 wt. % to 20 wt. %, from 5 wt. % to 25 wt. %, from 5 wt. % to 30 wt. %, from 5 wt. % to 35 wt. %, from 5 wt. % to 40 wt. %, from 5 wt. % to 45 wt. %, from 5 wt. % to 50 wt. %, from 5 wt. % to 55 wt. %, from 10 wt. % to 15 wt. %, from 10 wt. % to 20 wt. %, from 10 wt. % to 25 wt. %, from 10 wt. % to 30 wt. %, from 10 wt. % to 35 wt. %, from 10 wt. % to 40 wt. %, from 10 wt. % to 45 wt. %, from 10 wt. % to 50 wt. %, from 10 wt. % to 55 wt. %, from 10 wt. % to 60 wt. %, from 15 wt. % to 20 wt. %, from 15 wt. % to 25 wt. %, from 15 wt. % to 30 wt. %, from 15 wt. % to 35 wt. %, from 15 wt. % to 40 wt. %, from 15 wt. % to 45 wt. %, from 15 wt. % to 50 wt. %, from 15 wt. % to 55 wt. %, from 20 wt. % to 25 wt. %, from 20 wt. % to 30 wt. %, from 20 wt. % to 35 wt. %, from 20 wt. % to 40 wt. %, from 20 wt. % to 45 wt. %, from 20 wt. % to 50 wt. %, from 20 wt. % to 55 wt. %, from 20 wt. % to 60 wt. %, from 25 wt. % to 30 wt. %, from 25 wt. % to 35 wt. %, from 25 wt. % to 40 wt. %, from 25 wt. % to 45 wt. %, from 25 wt. % to 50 wt. %, from 25 wt. % to 55 wt. %, from 25 wt. % to 60 wt. %, from 30 wt. % to 35 wt. %, from 30 wt. % to 40 wt. %, from 30 wt. % to 45 wt. %, from 30 wt. % to 50 wt. %, from 30 wt. % to 55 wt. %, from 30 wt. % to 60 wt. %, from 35 wt. % to 40 wt. %, from 35 wt. % to 45 wt. %, from 35 wt. % to 50 wt. %, from 35 wt. % to 55 wt. %, from 35 wt. % to 60 wt. %, from 40 wt. % to 45 wt. %, from 40 wt. % to 50 wt. %, from 40 wt. % to 55 wt. %, from 40 wt. % to 60 wt. %, from 45 wt. % to 50 wt. %, from 45 wt. % to 55 wt. %, from 45 wt. % to 60 wt. %, from 50 wt. % to 55 wt. %, from 50 wt. % to 60 wt. %, or from 55 wt. % to 60 wt. % framework-substituted USY zeolite based on the total weight of the FCC catalyst composition.

In addition to the framework-substituted USY zeolite, the FCC catalyst composition may also include the FCC zeolite cracking additive. The FCC zeolite cracking additive may comprise one or more of a MFI-framework zeolite, a MEL-framework zeolite, a beta framework zeolite, a mordenite framework zeolite or combinations of these. Further, the FCC catalyst composition may comprise any other olefin selective additives.

In embodiments, the FCC zeolite cracking additive may comprise an MFI-framework additive In some embodiments, the MFI-framework additive may comprise a ZSM-5 zeolite. As used in this disclosure, "MFI-framework zeolite" refers to zeolites having a MFI-framework type according to the IUPAC zeolite nomenclature and consisting of silica and alumina. ZSM-5 refers to "Zeolite Socony Mobil-5" and is a pentasil family zeolite that can be represented by the chemical formula $Na_nAl_nSi_{96-n}O_{192} \cdot 16H_2O$, where 0<n<27. In other embodiments, FCC zeolite cracking additive may include an MEL-framework zeolite. The MEL-framework zeolite may be a ZSM-11 zeolite. ZSM-5 refers to "Zeolite Socony Mobil-11" and is a pentasil family zeolite that can be represented by the chemical formula $Na_nAl_nSi_{96-n}O_{192} \cdot 16H_2O$, where $0<n<16$.

In embodiments, the FCC catalyst composition may comprise from 1 wt. % to 50 wt. % FCC zeolite cracking additive based on the total weight of the FCC catalyst composition, such as from 1 wt. % to 5 wt. %, from 1 wt. % to 10 wt. %, from 1 wt. % to 15 wt. %, from 1 wt. % to 20 wt. %, from 1 wt. % to 25 wt. %, from 1 wt. % to 30 wt. %, from 1 wt. % to 35 wt. %, from 1 wt. % to 40 wt. %, from 1 wt. % to 45 wt. %, from 5 wt. % to 10 wt. %, from 5 wt. % to 15 wt. %, from 5 wt. % to 20 wt. %, from 5 wt. % to 25 wt. %, from 5 wt. % to 30 wt. %, from 5 wt. % to 35 wt. %, from 5 wt. % to 40 wt. %, from 5 wt. % to 45 wt. %, from 5 wt. % to 50 wt. %, from 10 wt. % to 15 wt. %, from 10 wt. % to 20 wt. %, from 10 wt. % to 25 wt. %, from 10 wt. % to 30 wt. %, from 10 wt. % to 35 wt. %, from 10 wt. % to 40 wt. %, from 10 wt. % to 45 wt. %, from 10 wt. % to 50 wt. %, from 15 wt. % to 20 wt. %, from 15 wt. % to 25 wt. %, from 15 wt. % to 30 wt. %, from 15 wt. % to 35 wt. %, from 15 wt. % to 40 wt. %, from 15 wt. % to 45 wt. %, from 15 wt. % to 50 wt. %, from 20 wt. % to 25 wt. %, from 20 wt. % to 30 wt. %, from 20 wt. % to 35 wt. %, from 20 wt. % to 40 wt. %, from 20 wt. % to 45 wt. %, from 20 wt. % to 50 wt. %, from 25 wt. % to 30 wt. %, from 25 wt. % to 35 wt. %, from 25 wt. % to 40 wt. %, from 25 wt. % to 45 wt. %, from 25 wt. % to 50 wt. %, from 30 wt. % to 35 wt. %, from 30 wt. % to 40 wt. %, from 30 wt. % to 45 wt. %, from 30 wt. % to 50 wt. %, from 35 wt. % to 40 wt. %, from 35 wt. % to 45 wt. %, from 35 wt. % to 50 wt. %, from 40 wt. % to 45 wt. %, from 40 wt. % to 50 wt. %, or from 45 wt. % to 50 wt. % FCC zeolite cracking additive based on the total weight of the FCC catalyst composition.

The FCC catalyst composition may comprise from 15 wt. % to 60 wt. % inorganic filler based on the total weight of the FCC catalyst composition. For example, the FCC catalyst composition may comprise from 15 wt. % to 20 wt. %, from 15 wt. % to 25 wt. %, from 15 wt. % to 30 wt. %, from 15 wt. % to 35 wt. %, from 15 wt. % to 40 wt. %, from 15 wt. % to 45 wt. %, from 15 wt. % to 50 wt. %, from 15 wt. % to 55 wt. %, from 20 wt. % to 25 wt. %, from 20 wt. % to 30 wt. %, from 20 wt. % to 35 wt. %, from 20 wt. % to 40 wt. %, from 20 wt. % to 45 wt. %, from 20 wt. % to 50 wt. %, from 20 wt. % to 55 wt. %, from 20 wt. % to 60 wt. %, from 25 wt. % to 30 wt. %, from 25 wt. % to 35 wt. %, from 25 wt. % to 40 wt. %, from 25 wt. % to 45 wt. %, from 25 wt. % to 50 wt. %, from 25 wt. % to 55 wt. %, from 25 wt. % to 60 wt. %, from 30 wt. % to 35 wt. %, from 30 wt. % to 40 wt. %, from 30 wt. % to 45 wt. %, from 30 wt. % to 50 wt. %, from 30 wt. % to 55 wt. %, from 30 wt. % to 60 wt. %, from 35 wt. % to 40 wt. %, from 35 wt. % to 45 wt. %, from 35 wt. % to 50 wt. %, from 35 wt. % to 55 wt. %, from 35 wt. % to 60 wt. %, from 40 wt. % to 45 wt. %, from 40 wt. % to 50 wt. %, from 40 wt. % to 55 wt. %, from 40 wt. % to 60 wt. %, from 45 wt. % to 50 wt. %, from 45 wt. % to 55 wt. %, from 45 wt. % to 60 wt. %, from 50 wt. % to 55 wt. %, from 50 wt. % to 60 wt. %, or from 55 wt. % to 60 wt. % inorganic filler based on the total weight of the FCC catalyst composition. The inorganic filler may be silica based or alumina based. The inorganic filler may comprise one or more of silica sol, water glass (sodium silicate), silicic acid liquid, basic aluminum chloride, aluminum biphosphate, alumina sol, activated alumina, porous silica, a metal trapping agent, or combinations of these. In embodiments, the inorganic filler may be a silica sol comprising $SiO_2$. The silica sol comprising $SiO_2$ at a concentration from 10 mass percent to 15 mass percent may be prepared by adding water glass comprising $SiO_2$ at a concertation ranging from 12 mass percent to 23 mass percent and sulfuric acid having a concentration ranging from 20 mass percent to 30 mass percent simultaneously and continuously. A solution obtained by dissolving one or more crystallite alumina, such as gibbsite, bayerrite, or boehmite in an acid solution may be used as the aluminum compound filler. Basic aluminum chloride can be expressed by Formula (1).

$$[Al_2(OH)_nCL_{6-n}]_m \quad (1)$$

(where, $0<n<6$ and $1<m<10$, and the symbol m represents a natural number).

Aluminum biphosphate, also referred to as aluminum dihydrogen phosphate or primary aluminum phosphate, is expressed by $Al(H_2PO_4)_3$. Alumina sol may be produced by, for example, pH adjustment of pseudoboehmite alumina with an acid. The inorganic oxides can be activated alumina, porous silica, rare-earth metal compounds, and metal capture agents (metal-trapping agents).

The FCC catalyst compositions may comprise one or more matrix materials. As use in this disclosure, "matrix materials" may refer to a clay material such as kaolin. Without being bound by theory, it is believed that the matrix materials of the FCC catalyst composition may serve both physical and catalytic functions. Physical functions include providing particle integrity and attrition resistance, acting as a heat transfer medium, and providing a porous structure to allow diffusion of hydrocarbons into and out of the catalyst microspheres. The matrix can also affect catalyst selectivity, product quality, and resistance to poisons. The matrix materials may tend to exert its strongest influence on overall catalytic properties for those reactions that directly involve relatively large molecules. In embodiments, the matrix material comprises kaolin. As used in this disclosure, "kaolin" refers to a clay material that has a relatively large amount (such as at least about 50 wt. %, at least 60 wt. %, at least 70 wt. %, at least 80 wt. %, at least 90 wt. %, or even at least 95 wt. %) of kaolinite, which can be represented by the chemical formula $Al_2Si_2O_5(OH)_4$. In additional embodiments, the matrix material may comprise other clay materials.

The FCC catalyst composition may include one or more matrix materials in an amount of from 30 wt. % to 60 wt. % based on the total weight of the FCC catalyst composition. In embodiments, the FCC catalyst composition may comprise from 30 wt. % to 55 wt. %, from 30 wt. % to 50 wt. %, from 30 wt. % to 45 wt. %, from 30 wt. % to 40 wt. %, from 30 wt. % to 35 wt. %, from 35 wt. % to 60 wt. %, from 40 wt. % to 60 wt. %, from 45 wt. % to 60 wt. %, from 50 wt. % to 60 wt. %, or from 55 wt. % to 60 wt. % matrix material based on the total weight of the FCC catalyst composition. In embodiments, the FCC catalyst composition may include any single disclosed matrix material in an amount of the disclosed wt. % ranges. In embodiments, the FCC catalyst composition may include any two or more matrix materials in combination in an amount of the disclosed wt. % ranges.

In embodiments, the FCC catalyst composition may include a rare earth oxide having chemical formula of $RE_2O_3$ where RE is a rare earth metal. The rare earth metal of the rare earth metal oxide may comprise one or more of cerium (Ce), lanthanum (La), praseodymium (Pr), neodymium (Nd), or combinations of these. The FCC catalyst composition may comprise from 0.0 wt. % to 6.0 wt. % rare earth oxide based on the total weight of the FCC catalyst composition. The FCC catalyst composition may comprise from 0.0 wt. % to 0.5 wt. %, from 0.0 wt. % to 1.0 wt. %, from 0.0 wt. % to 1.5 wt. %, from 0.0 wt. % to 2.0 wt. %, from 0.0 wt. % to 2.5 wt. %, from 0.0 wt. % to 3.0 wt,%, from 0.0 wt. % to 4 wt. %, from 0.0 wt. % to 5 wt. %, from 0.5 wt. % to 1.0 wt. %, from 0.5 wt. % to 1.5 wt. %, from 0.5 wt. % to 2.0 wt. %, from 0.5 wt. % to 2.5 wt. %, from 0.5 wt. % to 3.0 wt. %, from 0.5 wt. % to 4.0 wt. %, from 0.5 wt. % to 5.0 wt. %, from 0.5 wt. % to 6.0 wt. %, from 1.0 wt. % to 1.5 wt. %, from 1.0 wt. % to 2.0 wt. %, from 1.0 wt. % to 2.5 wt. %, from 1.0 wt. % to 3.0 wt. %, from 1.0 wt. % to 4.0 wt. %, from 1.0 wt. % to 5.0 wt. %, from 1.0 wt. % to 6.0 wt. %, from 1.5 wt. % to 2.0 wt. %, from 1.5 wt. % to 2.5 wt. %, from 1.5 wt. % to 3.0 wt. %, from 1.5 wt. % to 4.0 wt. %, from 1.5 wt. % to 5.0 wt. %, from 1.5 wt. % to 6.0 wt. %, from 2.0 wt. % to 2.5 wt. %, from 2.0 wt. % to 3.0 wt. %, from 2.5 wt. % to 3.0 wt. %, from 2.0 wt. % to 4.0 wt. %, from 2.0 wt. % to 5.0 wt. %, from 2.0 wt. % to 6.0 wt. %, from 3.0 wt. % to 4.0 wt. %, from 3.0 wt. % to 5.0 wt. %, from 3.0 wt. % to 6.0 wt. %, from 4.0 wt. % to 5.0 wt. %, or from 4.0 wt. % to 6.0 wt. % rare earth oxide based on the total weight of the FCC catalyst composition.

The FCC catalyst composition of the present disclosure may be in the form of shaped microparticles, such as microspheres. As described, "microparticles" refer to particles having a size of from 0.1 microns to 100 microns. The size of the microparticle refers to the maximum length of a particle from one side to another, measured along the longest distance of the microparticle. For example, a spherically shaped microparticle has a size equal to its diameter, while a rectangular prism shaped microparticle has a maximum length equal to the hypotenuse stretching from opposite corners.

According to embodiments, the zeolites of the FCC catalyst composition (framework-substituted USY zeolite and FCC zeolite cracking additive) may all be included in each microparticle. However, in other embodiments, microparticles may be mixed where the microparticles contain only a portion of the FCC catalyst composition. For example, a mixture of two microparticle types may be included in the FCC catalyst composition, where one type of microparticle includes the framework-substituted USY zeolite and one type of microparticle includes FCC zeolite cracking additive.

The FCC catalyst composition may be formed by a variety of processes. In embodiments, the matrix material may be mixed with a fluid such as water to form a slurry, and the framework-substituted USY zeolites and the FCC zeolite cracking additives may be separately mixed with a fluid such as water to form a slurry. The matrix material slurry and the zeolite slurry may be combined under stirring. Separately, another slurry may be formed by combining the inorganic filler material with a fluid such as water. The inorganic filler slurry may then be combined with the slurry containing the matrix material and the zeolites to form an all-ingredients slurry. The all-ingredients slurry may be dried, for example by spraying, and then calcined, to produce the microparticles of the FCC catalyst composition. According to another embodiment, the framework-substituted USY zeolite and the FCC zeolite cracking additive may be mixed while dry to produce the microparticles of the FCC catalyst composition.

In one or more embodiments, the FCC catalyst composition may be formed by first adding activated alumina to silica sol. Then, a slurry of the framework-substituted USY zeolite may be prepared with 20 wt. % to 30 wt. % sulfuric acid. The slurry of framework-substituted USY zeolite may have a pH in the range of 3 to 5. Similarly, a slurry of the FCC zeolite cracking additive may also be prepared. The activated alumina and silica sol may be combined with the slurry of framework-substituted USY zeolite and the slurry of the FCC zeolite cracking additive to form a slurry mixture. Then, the slurry mixture may be spray dried to form spherical particles. After spray drying, the spherical particles may be washed. Then, the spherical particles may be contacted with an aqueous solution of a rare earth metal chloride for ion exchange, such that the FCC catalyst composition includes from 0 wt. % to 6 wt. % rare earth oxide based on the weight of the framework-substituted USY zeolite. Finally, the spherical particles may be dried to yield the FCC catalyst composition.

The FCC catalyst compositions of the present disclosure may be incorporated into a system for upgrading hydrocarbons through fluid catalytic cracking. Referring to FIG. 1, one embodiment of a reactor system 100 that may be suitable for use with for the methods of upgrading a hydrocarbon feed of the present disclosure is schematically depicted. However, it should be understood that other reactor system configurations may be suitable for the methods described in the present disclosure. The reactor system 100 comprises an FCC unit 110 and a catalyst regeneration unit 120. As used in the present disclosure in the context of FIG. 1, the FCC unit 110 generally refers to a portion of the reactor system 100 in which the major process reaction takes place, such as the upgrading of a hydrocarbon feed to form light olefins. The FCC unit 110 may include a riser portion 112, a reaction zone 114, and a separation zone 116. The reactor system 100 may also comprise a regeneration zone 122 for regenerating spent catalyst.

In embodiments, a hydrocarbon feed 111 may be introduced to the reaction zone 114 with steam or other suitable gas for atomization of the feed (not shown). The hydrocarbon feed 111 may be admixed and contacted with an effective quantity of heated fresh or regenerated catalyst particles. The heated fresh or regenerated catalyst particles may be the FCC catalyst compositions of the present disclosure and may have any of the features, compositions, or properties previously described in the present disclosure for the FCC catalyst compositions. The heated fresh or regenerated catalyst particles may be conveyed via a conduit 123 from the regeneration zone 122. The hydrocarbon feed 111 and the FCC catalyst composition may be contacted and then passed into the reactor zone 114. In a continuous process, the mixture of the FCC catalyst composition and hydrocarbon feed 111 may proceed upward through the riser portion 112 into reaction zone 114. In the riser portion 112 and the reactor portion 114, the hydrocarbons from the hydrocarbon feed 111 may be contacted with the FCC catalyst composition particles at reaction conditions. Contact of the hydrocarbons from the hydrocarbon feed 111 with the FCC catalyst composition particles at the reaction conditions may cause at least a portion of the hydrocarbons to react and undergo cracking reactions to form upgraded hydrocarbons, which may include light olefins such as but not limited to ethylene, propylene, butenes, or combinations of these.

During the reaction, the FCC catalyst composition particles may become coked, which may result in limited or non-existent access to the active catalytic sites of the FCC catalyst composition particles. Reaction products may be separated from the coked catalyst particles using any suitable configuration known in the art. This separation may occur in the zone generally referred to as the separation zone 116, which may be located above the reaction zone 114. The reaction product may be withdrawn via conduit 119. FCC catalyst composition particles containing coke deposits from the reaction may be pass through conduit 115 to the regeneration zone 122.

In the regeneration zone 122, the coked FCC catalyst composition particles may come into contact with a stream of oxygen-containing gas, which may enter the regeneration zone 122 via conduit 121. The regeneration zone 122 may be operated in a configuration under conditions that are known in FCC operations. For instance, the regeneration zone 122 may be operated as a fluidized bed to produce regeneration off-gas comprising combustion products, which may be discharged via conduct 125. The hot regenerated FCC catalyst composition particles may be transferred from the regeneration zone 122 of the catalyst regeneration unit 120 via conduit 123 to the bottom portion of the riser reactor 112 for admixture with the hydrocarbon feed 111 as noted above.

Referring to FIG. 2, one embodiment of an example reactor system 200 that may be suitable for use with for the methods of upgrading a hydrocarbon feed described in the present disclosure is schematically depicted. Again, it should be understood that other reactor system configurations may be suitable for the methods described in the present disclosure. The reactor system 200 may generally comprise multiple components, such as an FCC unit 210 and a catalyst regeneration unit 220. As used in the present disclosure in the context of FIG. 2, the FCC unit 210 generally refers to a unit of the reactor system 200 in which the major process reaction takes place, such as the upgrading of a hydrocarbon feed to form light olefins. The FCC unit 210 may include a reactor zone 212, a separation zone 214, and a stripper zone 216. As used in the context of FIG. 2, the reactor system 200 may also comprise a regeneration zone 222 for regenerating spent catalyst.

In embodiments, a hydrocarbon feed 211 may be introduced through a downer portion of the reactor system 200 to the reaction zone 212 with steam or other suitable gas for atomization of the feed (not shown). An effective amount of heated fresh or regenerated FCC catalyst composition particles from regeneration zone 222 may be conveyed to the top of the reaction zone 212. The heated fresh or hot regenerated FCC catalyst composition particles from regeneration zone 222 may be conveyed to the top of the reaction zone 212 through a downwardly directed conduit 268, commonly referred to as a transfer line or standpipe, to a withdrawal or hopper (not shown) at the top of the reaction zone 212. The flow of hot FCC catalyst composition particles may typically be allowed to stabilize in order to be uniformly directed into the mix zone or feed injection portion of the reaction zone 212. The hydrocarbon feed 211 may be injected into a mixing zone through feed injection nozzles typically situated proximate to the point of introduction of the regenerated FCC catalyst composition particles into reaction zone 212. These multiple injection nozzles may result in the FCC catalyst composition particles and hydrocarbon feed 211 mixing thoroughly and uniformly. Once the hydrocarbon feed 211 contacts the hot FCC catalyst composition particles, a catalytic reaction may begin.

The reaction vapor of hydrocarbon products may flow through the remainder of the reaction zone 212 and into separation zone 214. Hydrocarbon products and unreacted hydrocarbons may be directed through conduit 219 to various product recovery sections. In embodiments, if necessary for temperature control, a quench injection (not shown) can be provided near the bottom of the reaction zone 212 or immediately before the separation zone 214. This quench injection may quickly reduce or stop the catalytic reaction.

The reaction temperature (which may be equivalent to the outlet temperature of the FCC unit 210) may be controlled by opening and closing a catalyst slide valve (not shown) that may control the flow of regenerated FCC catalyst composition particles from the regeneration zone 222 into the top of the reaction zone 212.

The stripper zone 216 may also be present for separating the FCC catalyst composition particles from the hydrocarbon products and unreacted hydrocarbons. The FCC catalyst composition particles from separation zone 214 may pass to the stripper zone 216. In the stripper zone 216, a suitable stripping gas, such as steam, may be introduced through streamline 213. The stripping zone 216 may comprise a plurality of baffles or structured packing (not shown) over which downwardly flowing catalyst particles passes countercurrently to the stripping gas. The upwardly flowing stripping gas may strip or remove any additional hydrocarbons that remain in the catalyst particle pores or between catalyst particles. The stripped or spent FCC catalyst composition particles may be passed from the stripper zone 216 via conduit 215 to the catalyst regeneration unit 220. The stripped or spent FCC catalyst composition particles may be transported by lift forces from a combustion air stream 221 through a lift riser of the catalyst regeneration unit 220. The stripped or spent FCC catalyst composition particles may then be contacted with additional combustion air and undergo controlled combustion of any accumulated coke in the regeneration zone 222. Flue gasses may be removed from the regeneration zone 222 via conduit 225. In the regenerator, the heat produced from the combustion of any coke by-product may be transferred to the FCC catalyst composition particles, which may increase the temperature required to provide heat to the catalytic reaction in the reaction zone 212.

A method for upgrading a hydrocarbon feed may include contacting the hydrocarbon feed with an FCC catalyst composition at reaction conditions sufficient to upgrade at least a portion of the hydrocarbon feed, where the FCC catalyst composition comprises a framework-substituted USY zeolite and from 1 weight percent to 50 weight percent FCC zeolite cracking additive based on the total weight of the FCC catalyst composition. The framework-substituted USY zeolite may include hafnium, zirconium, titanium, or combinations of these substituted into the framework of the framework-substituted USY zeolite.

The hydrocarbon feed may include one or more of crude oil, synthetic crude oil, bitumen, oil sand, shale oil, coal liquid, naphtha, diesel, vacuum gas oil, vacuum residue, de-metalized oil, de-asphalted oil, coker gas oil, cycle oil, gas oil, or combinations of these. In embodiments, the hydrocarbon feed may be derived from one or more of crude oil, synthetic crude oil, bitumen, oil sand, shale oil, coal liquid, naphtha, diesel, vacuum gas oil, vacuum residue, de-metalized oil, de-asphalted oil, coker gas oil, cycle oil, gas oil, or combinations of these. The hydrocarbon feed may have an atmospheric boiling point range greater than or equal to 350° C. As used through the present disclosure, "atmosphere boiling point range" may refer to the temperature interval from the initial boiling point to a final boiling point, where initial boiling point refers to the temperature at which the first drop of distillation product is obtained and final boiling point refers to the temperature at which the highest-boiling point compounds evaporate.

In embodiments, the hydrocarbon feed may comprise a hydrocracking recycle stream or unconverted bottoms stream from a hydrocracking unit having the following properties shown in Table 1.

TABLE 1

| Property | Unit | Value |
| --- | --- | --- |
| Density (at 15° C.) | g/mL | 0.8419 |
| Micro Carbon Residue (MCR) | wt. % | 0.02 |
| Nitrogen | ppm | <5 |
| Sulfur | ppm | 50 |
| Aromatics | wt. % | 0.47 |
| Hydrogen | wt. % | 13.77 |

The hydrocarbon feed may be contacted with the FCC catalyst composition at a temperature from 450° C. to 700° C. The hydrocarbon feed may be contacted with the FCC catalyst composition at a temperature from 450° C. to 500° C., from 450° C. to 550° C., from 450° C. to 650° C., from 500° C. to 550° C., from 500° C. to 600° C., from 500° C. to 650° C., from 500° C. to 700° C., from 550° C. to 600° C., from 550° C. to 650° C., from 550° C. to 700° C., from 600° C. to 650° C., from 600° C. to 700° C., or from 650° C. to 700° C.

The hydrocarbon feed may be contacted with the FCC catalyst composition at a pressure from 0.1 megapascals to 1 megapascals (MPa). The hydrocarbon feed may be contacted with the FCC catalyst composition at a pressure from 0.1 MPa to 0.2 MPa, from 0.1 MPa to 0.3 MPa, from 0.1 MPa to 0.4 MPa, from 0.1 MPa to 0.5 MPa, from 0.1 MPa to 0.6 MPa, from 0.1 MPa to 0.7 MPa, from 0.1 MPa to 0.8 MPa, from 0.1 MPa to 0.9 MPa, from 0.3 MPa to 0.4 MPa, from 0.3 MPa to 0.5 MPa, from 0.3 MPa to 0.6 MPa, from 0.3 MPa to 0.7 MPa, from 0.3 MPa to 0.8 MPa, from 0.3 MPa to 0.9 MPa, from 0.3 MPa to 1.0 MPa, from 0.5 MPa to 0.6 MPa, from 0.5 MPa to 0.7 MPa, from 0.5 MPa to 0.8 MPa, from 0.5 MPa to 0.9 MPa, or from 0.5 MPa to 1.0 MPa.

The hydrocarbon feed may be contacted with the FCC catalyst composition at the reaction temperature for a residence time (the total time that the hydrocarbon feed spends in contact with the FCC catalyst composition) from 0.1 seconds to 60 seconds (s). The hydrocarbon feed may be contacted with the FCC catalyst composition at the reaction temperature for a residence time from 0.1 s to 10 s, from 0.1 s to 20 s, from 0.1 s to 30 s, from 0.1 s to 40 s, from 0.1 s to 50 s, from 10 s to 20 s, from 10 s to 30 s, from 10 s to 40 s, from 10 s to 50 s, from 10 s to 60 s, from 20 s to 30 s, from 20 s to 40 s, from 20 s to 50 s, from 20 s to 60 s, from 30 s to 40 s, from 30 s to 50 s, from 30 s to 60 s, from 40 s to 50 s, from 40 s to 60 s, or from 50 s to 60 s.

The hydrocarbon feed may be contacted with the FCC catalyst composition at a hydrocarbon feed to FCC catalyst composition mass ratio from 1:2 to 1:30. For example, the hydrocarbon feed may be contacted with the FCC catalyst composition at a hydrocarbon feed to FCC catalyst composition mass ratio from 1:1 to 1:15, from 1:1 to 1:10, or from 1:8 to 1:20.

The cracked effluent, as compared to the hydrocarbon feed, may comprise increased concentrations of one or more of gasoline, light cycle oil (LCO), heavy cycle oil (HCO), total gas ($C_4$ and lighter), dry gas ($C_2$ and lighter), liquefied petroleum gas ($C_3$-$C_4$), ethylene, propylene, and butenes.

The framework-substituted USY zeolite may include from 0.1 wt. % to 5 wt. % transition metal based on the weight of the framework-substituted USY zeolite. The one or more transition metal may include hafnium, titanium, zirconium, or combinations of these. In embodiments, the one or more transition metals includes hafnium. The one or more transition metals may further include zirconium or titanium. In embodiments, the framework-substituted USY zeolite may have a crystal lattice constant from 2.430 nm to 2.450 nm, a specific surface area from 600 m²/g to m²/g, a molar ratio of $SiO_2$ to $Al_2O_3$ from 5:1 to 100:1, or combinations of these properties.

The FCC catalyst composition may include from 5 wt. % to 60 wt. % framework-substituted USY zeolite based on the weight of the FCC catalyst composition. The FCC catalyst composition may further include from 15 wt. % to 60 wt. % inorganic filler based on the total weight of the FCC catalyst composition. The inorganic filler may include one or more of silica sol, basic aluminum chloride, aluminum biphosphate, alumina sol, kaolin, clay, activated alumina, porous silica, a rare earth oxide, a metal trapping agent, or combinations of these. The FCC catalyst composition may further include a rare earth oxide having chemical formula of $RE_2O_3$ and include from 0 wt. % to 6.0 wt. % rare earth oxide based on the weight of the framework-substituted USY zeolite. In embodiments, the rare earth metal of the rare earth oxide may include one or more of cerium, lanthanum, praseodymium, neodymium, or combinations of these. The FCC catalyst composition may have any other features, compositions, or properties previously described in the present disclosure for the FCC catalyst composition.

Referring again to FIGS. 1-2, a method for upgrading the hydrocarbon feed may include passing the hydrocarbon feed to a fluid catalytic cracking unit (FCC unit), contacting a hydrocarbon feed with a FCC catalyst composition in the FCC unit under reaction conditions sufficient to cause at least a portion of the hydrocarbon feed to undergo cracking reactions to produce a cracking reaction mixture comprising a used FCC catalyst composition and a cracked effluent comprising one or more olefins, where the FCC catalyst composition comprises a framework-substituted USY zeolite comprising, hafnium, zirconium, titanium, or combinations of these substituted into the framework of the framework-substituted USY zeolite, and from 1 weight percent to 50 weight percent FCC zeolite cracking additive based on the total weight of the FCC catalyst composition, passing the cracking reaction mixture to a catalyst separator that separates the cracking reaction mixture into the used FCC catalyst composition and the cracked effluent, and passing the cracked effluent out of the fluid catalytic cracking unit. In embodiments, the fluid catalytic cracking unit may be a downer reactor or a riser reactor. The FCC catalyst composition may have any other features, compositions, or properties previously described in the present disclosure for the FCC catalyst composition. The FCC unit may include any of the features or operating conditions previously described in the present disclosure for the FCC unit.

While the present description and examples are provided in the context of whole crude oil or desalted crude oil as the hydrocarbon feed 102, it should be understood that systems and processes described in the present disclosure may be applicable for the conversion of a wide variety of heavy oils, including, but not limited to, crude oil, vacuum residue, tar sands, bitumen, atmospheric residue, vacuum gas oils, or other heavy oils.

EXAMPLES

The various embodiments of FCC catalyst compositions and methods for upgrading hydrocarbons will be further clarified by the following examples. The examples are illustrative in nature, and should not be understood to limit the subject matter of the present disclosure.

Example 1: FCC Catalyst Composition (Framework-Substituted USY Zeolite with and without FCC Zeolite Cracking Additive)

In Example 1, two sets of Advanced Cracking Evaluation (ACE) tests were conducted using a feed sample of an unconverted hydrocracking bottoms stream, the properties of which are shown in Table 1. The ACE unit is described more in detail in U.S. Pat. No. 6,069,012. The activity of the FCC catalyst compositions were determined according to ASTM method D7964, entitled "Standard Test Method for Determining Activity of Fluid Catalytic Cracking (FCC) Catalysts in a Fluidized Bed." The first test was conducted with a framework-substituted USY zeolite, where a portion of the aluminum framework was substituted with zirconium and titanium. The second test was conducted with the FCC catalyst composition comprising the same framework-substituted USY zeolite of the first test and a FCC zeolite cracking additive according to the present disclosure. The FCC catalyst composition included 90 wt. % framework-substituted USY zeolite and 10 wt. % FCC zeolite cracking additive. The FCC zeolite cracking additive included a MFI-framework zeolite.

The catalysts (framework-substituted USY zeolite and the FCC catalyst composition) were conditioned according to ASTM method D4463, entitled "Guide for Metals Free Steam Deactivation of Fresh Fluid Cracking Catalyst." Each catalyst (framework-substituted USY zeolite and the FCC catalyst composition) were first calcined at 500° C. for four hours under a nitrogen flow. Then, the temperature was increased at the rate of 5° C. per minute. After the temperature reached 810° C., nitrogen flow was continued for thirty minutes until nitrogen flow was stopped and replaced with a steam flow. Water was fed to the preheating zone of the steamer at a rate of three liters per hour. While flowing steam at ambient pressure, the temperature was raised to 810° C. and kept there for six hours.

For each test, 5.0 to 11.0 grams of catalyst (framework-substituted USY zeolite or FCC catalyst composition) were transferred to the reactor, where the catalyst was heated to a sufficient reaction temperature at 600° C. with nitrogen gas through the feed injector and from the bottom to keep catalyst particles fluidized. When the catalyst bed temperature was within ±1° C. of the reaction temperature of 600° C., the hydrocarbon feed was injected at an injection rate of 1.5 grams per minute for an injection time of 45 seconds. The tests were carried out at 600° C., with a hydrocarbon feed to catalyst ratio from 4.5 to 9.8, and a residence time of 45 seconds.

The entire gaseous product was passed through a liquid receiver, where $C_{5+}$ hydrocarbons were condensed and non-condensable products were passed through to a gas receiver. After stripping is over, the reactor temperature was raised to 650° C. and nitrogen was changed to air for regeneration of catalyst. During regeneration, the flue gas from the regeneration process was passed through a $CO_2$ analyzer and the total amount of coke produced was calculated from the flue gas flow rate and $CO_2$ concentration.

An Agilent Micro GC with four TCD detectors was used to analyze the hydrocarbon gas products. The gas from the start of the feed injection to the liquid stripping was collected in the glass bottle by water displacement. The displaced water was collected in a vessel placed on the balance. The difference in the weights before and after was used to determine the volume of the gas. After stripping concluded, about 250 ml of the gas was used to purge the sampling line and the GC analysis was triggered by the software. All the components in the gas product stream including nitrogen, hydrogen, all $C_{1-4}$ hydrocarbons, and some $C_5$ and $C_6$ hydrocarbons were analyzed. $C_5$ and heavier yields were added to the gasoline product during the data processing.

For the liquid product, simulated distillation was carried out using a Varian GC equipped with a FID detector according to ASTM D-2887. Three different liquid cuts were considered: gasoline ($C_5$—less than 221° C.), light cycle oil (LCO—from 221° C. to 343° C.), and heavy cycle oil (HCO—greater than 343° C.). The weight percentage of liquid products were used to calculate conversion and yields.

The FCC catalyst composition comprising the framework-substituted USY zeolite and the FCC zeolite cracking additive resulted in a higher conversion as compared to the framework-substituted USY zeolite without the FCC zeolite cracking additive. As high as 91 wt. % conversion was achieved with the FCC catalyst composition with the FCC zeolite cracking additive, whereas the framework-substituted USY zeolite without the FCC zeolite cracking additive achieved a conversion of only 87 wt. %. Table 2 illustrates the changes in products between the two tests at a conversion of 87 wt. %. A positive change reflects a greater amount of a specific product in the FCC catalyst composition with the FCC zeolite cracking additive as compared to the framework-substituted USY zeolite without the FCC zeolite cracking additive, whereas a negative change reflects a lower amount of a specific product in the FCC catalyst composition with the FCC zeolite cracking additive as compared to the framework-substituted USY zeolite without the FCC zeolite cracking additive.

TABLE 2

| Product | Change (wt. %) |
| --- | --- |
| Gasoline | −9.5 |
| Light Cycle Oil (LCO) | −0.9 |
| Heavy Cycle Oil (HCO) | 0.8 |
| Total Gas ($C_4$ and Lighter) | 10.0 |
| Dry Gas ($C_2$ and Lighter) | 1.9 |
| Liquefied Petroleum Gas (LPG) ($C_3$-$C_4$) | 8.2 |
| Ethylene | 2.7 |
| Propylene | 8.0 |
| Butylene | 0.6 |
| Coke | −0.8 |

As seen from Table 2, the gasoline yield, LCO yield, and amount of coke decrease when using the FCC catalyst composition with a FCC zeolite cracking additive. Simultaneously, the HCO, total gas, dry gas, LPG, ethylene, propylene, and butylene yields all increase when using the FCC catalyst composition with a FCC zeolite cracking additive. In particular, the FCC catalyst composition provided increased yield of light olefins, such as ethylene, propylene, and butene compared to the framework-substituted USY zeolite by itself. Additionally, as previously mentioned, when using the FCC catalyst composition with a FCC zeolite cracking additive the overall conversion was 4 wt. % higher as compared to using the framework-substituted USY zeolite by itself without a FCC zeolite cracking additive.

One or more aspects of the present disclosure are described herein. A first aspect of the present disclosure may include a fluid catalytic cracking (FCC) catalyst composition comprising: a framework-substituted USY zeolite comprising one or more transition metals substituted into the framework of an USY zeolite; and from 1 weight percent to 50 weight percent FCC zeolite cracking additive based on the total weight of the FCC catalyst composition.

A second aspect of the present disclosure may include the first aspect, in which the framework-substituted USY zeolite comprises from 0.1 weight percent to 5 weight percent of each transition metal based on the weight of the framework-substituted USY zeolite.

A third aspect of the present disclosure may include either the first or second aspects, in which the one or more transition metals comprises hafnium, zirconium, titanium, or combinations of these.

A fourth aspect of the present disclosure may include any one of the first through third aspects, in which the one or more transition metals comprise hafnium.

A fifth aspect of the present disclosure may include any one of the first through fourth aspects, in which the framework-substituted USY zeolite comprises a crystal lattice constant from 2.430 nanometers to 2.450 nanometers.

A sixth aspect of the present disclosure may include any one of the first through fifth aspects, in which the framework-substituted USY zeolite comprises a specific surface area from 600 square meters per gram to 900 square meters per gram.

A seventh aspect of the present disclosure may include any one of the first through sixth aspects, in which the framework-substituted USY zeolite comprises a molar ratio of $SiO_2$ to $Al_2O_3$ from 5:1 to 100:1.

An eighth aspect of the present disclosure may include any one of the first through seventh aspects, in which the FCC catalyst composition comprises from 5 weight percent to 60 weight percent framework-substituted USY zeolite based on the total weight of the FCC catalyst composition.

A ninth aspect of the present disclosure may include the eighth aspect, further comprising from 15 weight percent to 60 weight percent inorganic filler based on the total weight of the FCC catalyst composition.

A tenth aspect of the present disclosure may include the ninth aspect, in which the inorganic filler comprises one or more of silica sol, basic aluminum chloride, aluminum biphosphate, alumina sol, activated alumina, porous silica, a metal trapping agent, or combinations of these.

An eleventh aspect of the present disclosure may include the tenth aspect, further comprising from 0.0 weight percent to 6.0 weight percent rare earth oxide based on the total weight of the FCC catalyst composition.

A twelfth aspect of the present disclosure may include the eleventh aspect, where a rare earth metal of the rare earth oxide comprises one or more of cerium, lanthanum, praseodymium, neodymium, or combinations of these.

A thirteenth aspect of the present disclosure may include any one of the first through twelfth aspects, in which the FCC catalyst composition comprises from 5 weight percent to 15 weight percent FCC zeolite cracking additive based on the total weight of the FCC catalyst composition.

A fourteenth aspect of the present disclosure may include any one of the first through thirteenth aspects, in which the FCC zeolite cracking additive comprises a MFI-framework zeolite.

A fifteenth aspect of the present disclosure may include any one of the first through fourteenths aspects, in which the FCC zeolite cracking additive comprises a ZSM-5 zeolite.

A sixteenth aspect of the present disclosure may include a method for upgrading a hydrocarbon feed, the method comprising: contacting the hydrocarbon feed with a FCC catalyst composition at reaction conditions sufficient to upgrade at least a portion of the hydrocarbon feed, where: the FCC catalyst composition comprises a framework-substituted USY zeolite and from 1 weight percent to 50 weight percent FCC zeolite cracking additive based on the total weight of the FCC catalyst composition, where the framework-substituted USY zeolite comprises hafnium, zirconium, titanium, or combinations of these substituted into the framework of the framework-substituted USY zeolite.

A seventeenth aspect of the present disclosure may include the sixteenth aspect, in which the hydrocarbon feed is contacted with the FCC catalyst composition at a temperature from 450 degrees Celsius to 700 degrees Celsius.

An eighteenth aspect of the present disclosure may include either the sixteenth or seventeenth aspects, in which the hydrocarbon feed is contacted with the FCC catalyst composition at a pressure from 0.1 megapascals to 1 megapascals.

A nineteenth aspect of the present disclosure may include any one of the sixteenth through eighteenth aspects, in which the hydrocarbon feed is contacted with the FCC catalyst composition at the reaction temperature for a residence time from 0.1 seconds to 60 seconds.

A twentieth aspect of the present disclosure may include any one of the sixteenth through nineteenth aspects, in which the hydrocarbon feed comprises one or more of crude oil, synthetic crude oil, bitumen, oil sand, shale oil, coal liquid, naphtha, diesel, vacuum gas oil, vacuum residue, de-metalized oil, de-asphalted oil, coker gas oil, cycle oil, gas oil, or combinations of these.

A twenty-first aspect of the present disclosure may include the twentieth aspect, in which the hydrocarbon feed has an atmospheric boiling point range greater than or equal to 350 degrees Celsius.

A twenty-second aspect of the present disclosure may include any one of the sixteenth through twenty-first aspects, in which the hydrocarbon feed is contacted with the FCC catalyst composition at a hydrocarbon feed to FCC catalyst composition mass ratio from 1:2 to 1:30.

A twenty-third aspect of the present disclosure may include any one of the sixteenth through twenty-second aspects, in which the framework-substituted USY zeolite comprises from 0.1 weight percent to 5 weight percent of each transition metal based on the weight of the framework-substituted USY zeolite.

A twenty-fourth aspect of the present disclosure may include any one of the sixteenth through twenty-third aspects, in which the one or more transition metals comprise hafnium.

A twenty-fifth aspect of the present disclosure may include the twenty-fourth aspect, in which the one or more transition metals further comprises zirconium or titanium.

A twenty-sixth aspect of the present disclosure may include any one of the sixteenth through twenty-fifth aspects, in which the framework-substituted USY zeolite comprises a crystal lattice constant from 2.430 nanometers to 2.450 nanometers.

A twenty-seventh aspect of the present disclosure may include any one of the sixteenth through twenty-sixth aspects, in which the framework-substituted USY zeolite comprises a specific surface area from 600 square meters per gram to 900 square meters per gram.

A twenty-eighth aspect of the present disclosure may include any one of the sixteenth through twenty-seventh aspects, in which the framework-substituted USY zeolite comprises a molar ratio of $SiO_2$ to $Al_2O_3$ from 5:1 to 100:1.

A twenty-ninth aspect of the present disclosure may include any one of the sixteenth through twenty-eighth aspects, in which the FCC catalyst composition comprises from 5 weight percent to 60 weight percent framework-substituted USY zeolite based on the total weight of the FCC catalyst composition.

A thirtieth aspect of the present disclosure may include the twenty-ninth aspect, further comprising from 15 weight percent to 60 weight percent inorganic filler based on the total weight of the FCC catalyst composition.

A thirty-first aspect of the present disclosure may include the thirtieth aspect, in which the inorganic filler comprises one or more of basic silica sol, aluminum chloride, aluminum biphosphate, alumina sol, activated alumina, porous silica, a metal trapping agent, or combinations of these.

A thirty-second aspect of the present disclosure may include the thirty-first aspect, in which the FCC catalyst composition comprises from 0.0 weight percent to 6.0 weight percent rare earth oxide having chemical formula of $RE_2O_3$ based on the total weight of the FCC catalyst composition.

A thirty-third aspect of the present disclosure may include the thirty-second aspect, where a rare earth metal of the rare earth oxide comprises one or more of cerium, lanthanum, praseodymium, neodymium, or combinations of these.

A thirty-fourth aspect of the present disclosure may include any one of the sixteenth through thirty-third aspects, in which the FCC catalyst composition comprises from 5 weight percent to 15 weight percent FCC zeolite cracking additive based on the total weight of the FCC catalyst composition.

A thirty-fifth aspect of the present disclosure may include any one of the sixteenth through thirty-fourth aspects in which the FCC zeolite cracking additive comprises a MFI-framework zeolite.

A thirty-sixth aspect of the present disclosure may include any one of the sixteenth through thirty-fifth aspects in which the FCC zeolite cracking additive comprises a ZSM-5 zeolite.

A thirty-seventh aspect of the present disclosure may include a method for upgrading a hydrocarbon feed, the method comprising: passing a hydrocarbon feed to a fluid catalytic cracking unit; contacting the hydrocarbon feed with a FCC catalyst composition in the fluid catalytic cracking unit under reaction conditions sufficient to cause at least a portion of the hydrocarbon feed to undergo cracking reactions to produce a cracking reaction mixture comprising a used FCC catalyst composition and a cracked effluent comprising one or more olefins, where: the FCC catalyst composition comprises a framework-substituted USY zeolite comprising, hafnium, zirconium, titanium, or combinations of these substituted into the framework of the framework-substituted USY zeolite; and from 1 weight percent to 50 weight percent FCC zeolite cracking additive based on the total weight of the FCC catalyst composition; passing the cracking reaction mixture to a catalyst separator that separates the cracking reaction mixture into the used FCC catalyst composition and the cracked effluent; and passing the cracked effluent out of the fluid catalytic cracking unit.

A thirty-eighth aspect of the present disclosure may include the thirty-seventh aspect, in which the hydrocarbon feed is contacted with the FCC catalyst composition at a temperature from 450 degrees Celsius to 700 degrees Celsius.

A thirty-ninth aspect of the present disclosure may include either the thirty-seventh or thirty-eighth aspects, in which the hydrocarbon feed is contacted with the FCC catalyst composition at a pressure from 0.1 megapascals to 1 megapascals.

A fortieth aspect of the present disclosure may include any one of the thirty-seventh through thirty-ninth aspects, in which the hydrocarbon feed is contacted with the FCC catalyst composition at the reaction temperature for a residence time from 0.1 seconds to 60 seconds.

A forty-first aspect of the present disclosure may include any one of the thirty-seventh through fortieth aspects, in which the hydrocarbon feed comprises one or more of crude oil, synthetic crude oil, bitumen, oil sand, shale oil, coal liquid, naphtha, diesel, vacuum gas oil, vacuum residue, de-metalized oil, de-asphalted oil, coker gas oil, cycle oil, gas oil, or combinations of these.

A forty-second aspect of the present disclosure may include forty-firth aspect, in which the hydrocarbon feed has an atmospheric boiling point range greater than or equal to 350 degrees Celsius.

A forty-third aspect of the present disclosure may include any one of the thirty-seventh through forty-second aspects, in which the hydrocarbon feed is contacted with the FCC catalyst composition at a hydrocarbon feed to FCC catalyst composition mass ratio from 1:2 to 1:30.

A forty-fourth aspect of the present disclosure may include any one of the thirty-seventh through forty-third aspects, in which the fluid catalytic cracking unit is a downer reactor.

A forty-fifth aspect of the present disclosure may include any one of the thirty-seventh through forty-fourth aspects, in which the fluid catalytic cracking unit is a riser reactor.

A forty-sixth aspect of the present disclosure may include any one of the thirty-seventh through forty-fifth aspects, in which the framework-substituted USY zeolite comprises from 0.1 weight percent to 5 weight percent of each transition metal based on the weight of the framework-substituted USY zeolite.

A forty-seventh aspect of the present disclosure may include any one of the thirty-seventh through forty-sixth aspects, in which the one or more transition metals comprise hafnium.

A forty-eighth aspect of the present disclosure may include the forty-seventh aspect, in which the one or more transition metals further comprises zirconium or titanium.

A forty-ninth aspect of the present disclosure may include any one of the thirty-seventh through forty-eighth aspects, in which the framework-substituted USY zeolite comprises a crystal lattice constant from 2.430 nanometers to 2.450 nanometers.

A fiftieth aspect of the present disclosure may include any one of the thirty-seventh through forty-ninth aspects, in which the framework-substituted USY zeolite comprises a specific surface area from 600 square meter per gram to 900 square meter per gram.

A fifty-first aspect of the present disclosure may include any one of the thirty-seventh through fiftieth aspects, in which the framework-substituted USY zeolite comprises a molar ratio of $SiO_2$ to $Al_2O_3$ from 5:1 to 100:1.

A fifty-second aspect of the present disclosure may include any one of the thirty-seventh through fifty-first aspects, in which the FCC catalyst composition comprises from 5 weight percent to 60 weight percent framework-substituted USY zeolite based on the weight of the FCC catalyst composition.

A fifty-third aspect of the present disclosure may include the fifty-second aspect, further comprising from 15 weight percent to 60 weight percent inorganic filler based on the total weight of the FCC catalyst composition.

A fifty-fourth aspect of the present disclosure may include the fifty-third aspect, in which the inorganic filler comprises one or more of silica sol, basic aluminum chloride, aluminum biphosphate, alumina sol, activated alumina, porous silica, a metal trapping agent, or combinations of these.

A fifty-fifth aspect of the present disclosure may include the fifty-fourth aspect, in which the FCC catalyst composition comprises from 0.0 weight percent to 6.0 weight percent rare earth oxide based on the total weight of the FCC catalyst composition, the rare earth oxide having chemical formula of $RE_2O_3$.

A fifty-sixth aspect of the present disclosure may include the fifty-fifth aspect, where a rare earth metal of the rare earth oxide comprises one or more of cerium, lanthanum, praseodymium, neodymium, or combinations of these.

A fifty-seventh aspect of the present disclosure may include any one of the thirty-seventh through fifty-sixth aspects, in which the FCC catalyst composition comprises from 5 weight percent to 15 weight percent FCC zeolite cracking additive based on the total weight of the FCC catalyst composition.

A fifty-eighth aspect of the present disclosure may include any one of the thirty-seventh through fifty-seventh aspects, in which the FCC zeolite cracking additive comprises a MFI-framework zeolite.

A fifty-ninth aspect of the present disclosure may include any one of the thirty-seventh through fifty-eighth aspects, in which the FCC zeolite cracking additive comprises a ZSM-5 zeolite.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A fluid catalytic cracking (FCC) catalyst composition comprising
   a framework-substituted USY zeolite comprising one or more transition metals substituted into the framework of an USY zeolite;
   from 1 weight percent to 50 weight percent FCC zeolite cracking additive based on the total weight of the FCC catalyst composition, and
   from 35 weight percent to 60 weight percent inorganic filler based on the total weight of the FCC catalyst composition, where the inorganic filler comprises one or more of silica sol, basic aluminum chloride, aluminum biphosphate, alumina sol, activated alumina, porous silica, a metal trapping agent, or combinations of these.

2. The FCC catalyst composition of claim 1, in which the one or more transition metals comprises hafnium, zirconium, titanium, or combinations of these.

3. The FCC catalyst composition of claim 1, in which the framework-substituted USY zeolite comprises a crystal lattice constant from 2.430 nanometers to 2.450 nanometers and a specific surface area from 600 square meters per gram to 900 square meters per gram.

4. The FCC catalyst composition of claim 1, in which the FCC catalyst composition comprises from 5 weight percent to 60 weight percent framework-substituted USY zeolite based on the total weight of the FCC catalyst composition.

5. The FCC catalyst composition of claim 1, in which the FCC catalyst composition comprises from 5 weight percent to 15 weight percent FCC zeolite cracking additive based on the total weight of the FCC catalyst composition.

6. The FCC catalyst composition of claim 1, in which the FCC zeolite cracking additive comprises a MFI-framework zeolite.

7. The FCC catalyst composition of claim 1, in which the FCC zeolite cracking additive comprises a ZSM-5 zeolite.

8. A method for upgrading a hydrocarbon feed, the method comprising:
   contacting the hydrocarbon feed with a FCC catalyst composition at reaction conditions sufficient to upgrade at least a portion of the hydrocarbon feed, where:
   the FCC catalyst composition comprises:
   a framework-substituted USY zeolite, where the framework-substituted USY zeolite comprises hafnium, zirconium, titanium, or combinations of these substituted into the framework of the framework-substituted USY zeolite;
   from 1 weight percent to 50 weight percent FCC zeolite cracking additive based on the total weigh to the FCC catalyst composition; and
   from 35 weight percent to 60 weight percent inorganic filler based on the total weight of the FCC catalyst composition, where the inorganic filler comprises one or more of silica sol, basic aluminum chloride, aluminum biphosphate, alumina sol, activated alumina, porous silica, a metal trapping agent, or combinations of these.

9. The method for upgrading the hydrocarbon feed of claim 8, in which the hydrocarbon feed is contacted with the FCC catalyst composition at a hydrocarbon feed to FCC catalyst composition mass ratio from 1:2 to 1:30, for a residence time from 0.1 seconds to 60 seconds, and a temperature of from 450 degrees Celsius to 700 degrees Celsius.

10. The method for upgrading the hydrocarbon feed of claim 8, in which the one or more transition metals further comprises zirconium or titanium.

11. The method for upgrading the hydrocarbon feed of claim 8, in which the FCC catalyst composition comprises from 5 weight percent to 60 weight percent framework-substituted USY zeolite based on the total weight of the FCC catalyst composition.

12. The method for upgrading the hydrocarbon feed of claim 8, further comprising from 15 weight percent to 60 weight percent inorganic filler based on the total weight of the FCC catalyst composition.

13. The method for upgrading the hydrocarbon feed of claim 8, in which the FCC catalyst composition comprises from 5 weight percent to 15 weight percent FCC zeolite cracking additive based on the total weight of the FCC catalyst composition.

14. The method for upgrading the hydrocarbon feed of claim 8, in which the FCC zeolite cracking additive comprises a MFI-framework zeolite.

15. The method for upgrading the hydrocarbon feed of claim 8, in which the FCC zeolite cracking additive comprises a ZSM-5 zeolite.

16. A method for upgrading a hydrocarbon feed, the method comprising passing a hydrocarbon feed to a fluid catalytic cracking unit;

contacting the hydrocarbon feed with a FCC catalyst composition in the fluid catalytic cracking unit under reaction conditions sufficient to cause at least a portion of the hydrocarbon feed to undergo cracking reactions to produce a cracking reaction mixture comprising a used FCC catalyst composition and a cracked effluent comprising one or more olefins, where the FCC catalyst composition comprises:

a framework-substituted USY zeolite comprising, hafnium, zirconium, titanium, or combinations of these substituted into the framework of the framework-substituted USY zeolite; and from 1 weight percent to 50 weight percent FCC zeolite cracking additive based on the total weight of the FCC catalyst, where the FCC zeolite cracking additive is an MEL-framework zeolite, a beta framework zeolite, a mordenite framework zeolite, or combinations of these;

passing the cracking reaction mixture to a catalyst separator that separates the cracking reaction mixture into the used FCC catalyst composition and the cracked effluent; and passing the cracked effluent out of the fluid catalytic cracking unit.

17. The method for upgrading the hydrocarbon feed of claim 16, in which the hydrocarbon feed is contacted with the FCC catalyst composition at a hydrocarbon feed to FCC catalyst composition mass ratio from 1:2 to 1:30.

18. The method for upgrading the hydrocarbon feed of claim 16, in which the one or more transition metals further comprises zirconium or titanium.

19. The method for upgrading the hydrocarbon feed of claim 16, in which the FCC catalyst composition comprises from 5 weight percent to 60 weight percent framework-substituted USY zeolite based on the weight of the FCC catalyst composition.

20. The method for upgrading the hydrocarbon feed of claim 16, in which the FCC zeolite cracking additive comprises a MFI-framework zeolite.

\* \* \* \* \*